United States Patent

Oh

[11] Patent Number: 5,734,213
[45] Date of Patent: Mar. 31, 1998

[54] HEAD DRUM ASSEMBLY FOR USE IN A VIDEO CASSETTE RECORDER

[75] Inventor: Se-Woog Oh, Seoul, Rep. of Korea

[73] Assignee: Daewoo Electronics Co., Ltd., Seoul, Rep. of Korea

[21] Appl. No.: 532,036

[22] Filed: Sep. 22, 1995

[30] Foreign Application Priority Data

Nov. 21, 1994 [KR] Rep. of Korea ............ 94-30745

[51] Int. Cl.⁶ ............... H02K 7/00; H02K 7/08; G11B 5/52
[52] U.S. Cl. ............ 310/67 R; 310/90; 310/90.5; 360/107; 360/84; 360/130.24; 360/108
[58] Field of Search .............. 360/130.34, 136, 360/87, 107, 84, 109, 130.24, 130.22; 310/67 R, 90, 90.5, 261, 51

[56] References Cited

U.S. PATENT DOCUMENTS

| | | | |
|---|---|---|---|
| 4,117,519 | 9/1978 | Shioyama et al. | 360/84 |
| 4,347,536 | 8/1982 | Miyashita et al. | 360/107 |
| 5,119,257 | 6/1992 | Itou et al. | 360/130.24 |
| 5,223,758 | 6/1993 | Kataoka et al. | 310/90 |
| 5,317,466 | 5/1994 | Hasegawa | 360/107 |
| 5,381,285 | 1/1995 | Dona | 360/98.07 |
| 5,392,180 | 2/1995 | Hasegawa | 360/107 |
| 5,442,506 | 8/1995 | Kang | 360/107 |
| 5,471,104 | 11/1995 | Toshimitsu et al. | 310/90 |
| 5,515,220 | 5/1996 | Alioth | 360/108 |

*Primary Examiner*—Steven L. Stephan
*Assistant Examiner*—Michael J. Wallace, Jr.
*Attorney, Agent, or Firm*—Pennie and Edmonds, LLP

[57] ABSTRACT

A head drum assembly for use in a VCR comprises a rotating shaft; a rotary drum; a stationary drum fitted around the rotating shaft; a pair of bearing assemblies that allow the rotating shaft and the rotating drum to rotate easily; a motor rotor; a motor stator; an electromagnet of a predetermined polarity, placed on a bottom surface of the motor stator, and activated by a voltage applied to it when the rotary drum is rotating; a permanent magnet, having the same polarity as the electromagnet, and being placed on an upper surface of the motor rotor opposite the electromagnet. Such a head drum assembly achieves smooth rotation of its rotary drum by applying the necessary pressure uniformly along an inner ring of its bearing assembly. Furthermore, by selectively applying pressure to the inner ring of the bearing assembly only at times of operation, i.e., when the rotary drum is rotating, the inventive head drum assembly minimizes wear and tear of the bearing assemblies, prolonging their lifespan.

3 Claims, 2 Drawing Sheets

HEAD DRUM ASSEMBLY FOR USE IN A VIDEO CASSETTE RECORDER

FIELD OF THE INVENTION

The present invention relates to a head drum assembly for use in a video cassette recorder ("VCR"); and, more particularly, to a head drum assembly capable of applying a uniform pressure to a pair of bearing assemblies so as to facilitate a stable rotation of a rotating shaft incorporated therein.

DESCRIPTION OF THE PRIOR ART

As is well known, a conventional head drum assembly for use in a VCR can be divided into an upper drum part including a rotary drum, and a lower drum part including a stationary drum.

There is shown in FIG. 1 the lower drum part of the conventional head drum assembly including: a rotating shaft 1; a flange 2 fitted tightly around the rotating shaft 1; a stationary drum 3 fitted around the rotating shaft 1; a lower and an upper bearing assemblies 7, 7', wherein each of the bearing assemblies 7, 7' is fitted between the rotating shaft 1 and the stationary drum 3, and each of the bearing assemblies, e.g. 7, is provided with an inner ring 7A closely fitted to the rotating shaft 1, an outer ring 7C fitting into the stationary drum 3, and a set of ball bearings 7B placed between the inner ring 7A and the outer ring 7C; a ring collar 5 fitted around the rotating shaft 1, and fixed in place by a set screw 6; and a conical washer spring 4, interposed between the ring collar 5 and the lower bearing assembly 7 in such a way that it applies a uniform pressure against the inner ring 7A of the lower bearing assembly 7.

The lower head drum part described above is assembled by pushing the ring collar 5 vertically along the rotating shaft 1 until the conical washer spring 4 applies a desired amount of uniform pressure against the inner ring 7A, and then fixing the ring collar 5 in place using the set screw 6.

However, in assembling the lower head drum part described above, the pressure being applied against the inner ring 7A by the washer spring 4 must be continuously measured as the ring collar 5 is pushed vertically along the rotating shaft 1, making the assembly process thereof complicated and difficult. Furthermore, in addition to the manufacturing difficulties, the washer spring 4 often turns out to be defective and unable to perform its function correctly, i.e., fails to exert a uniform pressure against the inner ring 7A. In such an event, the inner ring 7A may shift in relation to the rotating shaft 1, leading to an irregular rotation of the rotating shaft and the rotary drum in the upper drum part, and accelerating the wear and tear thereof.

SUMMARY OF THE INVENTION

It is, therefore, a primary object of the present invention to provide a head drum assembly capable of applying a uniform pressure to an inner ring of a bearing assembly incorporated therein, allowing a stable and regular rotation of a rotating shaft incorporated therein.

In accordance with the present invention, there is provided a head drum assembly for use in a VCR comprising: a rotating shaft; a rotary drum provided with an upper surface and fitting tightly around the rotating shaft; a stationary drum fitted around the rotating shaft; a pair of bearing assemblies placed between the stationary drum and the rotating shaft; a motor rotor installed on the upper surface of the rotary drum; a motor stator located above the upper surface of the rotary drum and maintaining a predetermined separation from the motor rotor; an electromagnet of a predetermined polarity placed on a bottom surface of the motor stator and activated by a voltage applied thereto when the rotary drum is rotated; a permanent magnet having the same polarity as the electromagnet and being placed on an upper surface of the motor rotor opposite the electromagnet.

BRIEF DESCRIPTION OF THE DRAWINGS

The above and other objects and features of the present invention will become apparent from the following description of preferred embodiments when taken in conjunction with the accompanying drawings, in which.

DETAILED DESCRIPTION OF THE PREFERRED EMBODIMENTS

Figure 1:
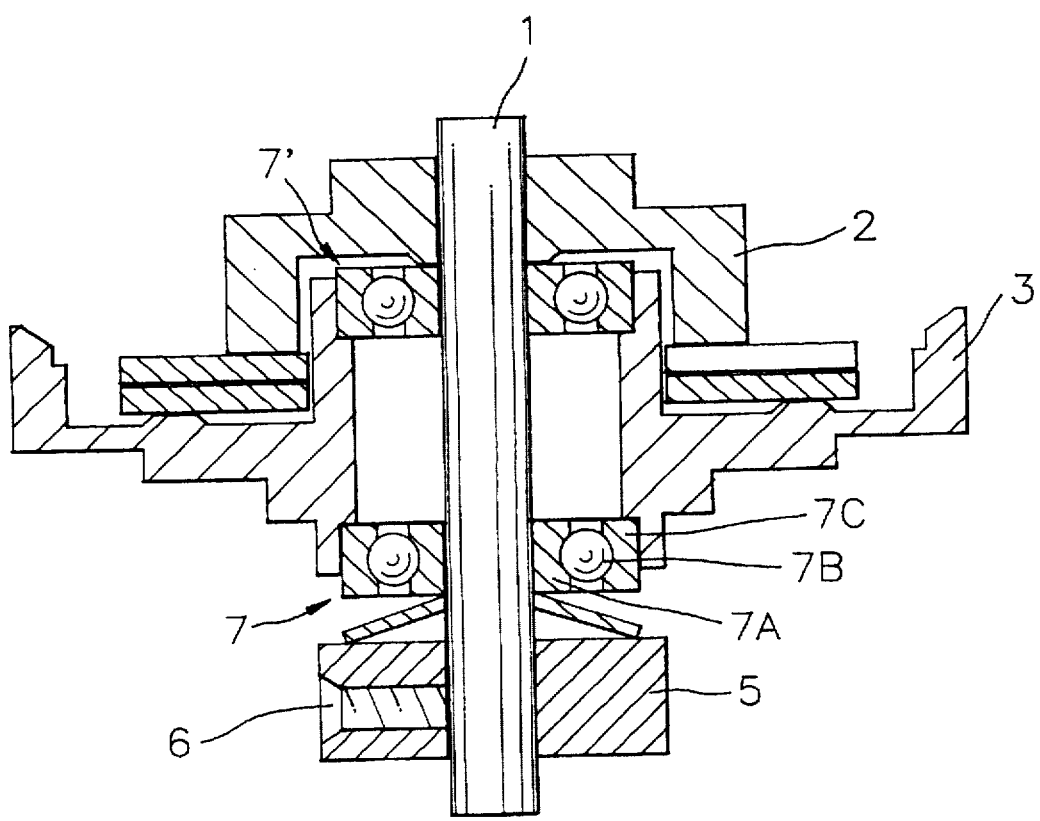
FIG. 1 presents a cross sectional view of a lower head drum part in a conventional head drum assembly.
Figure 2:
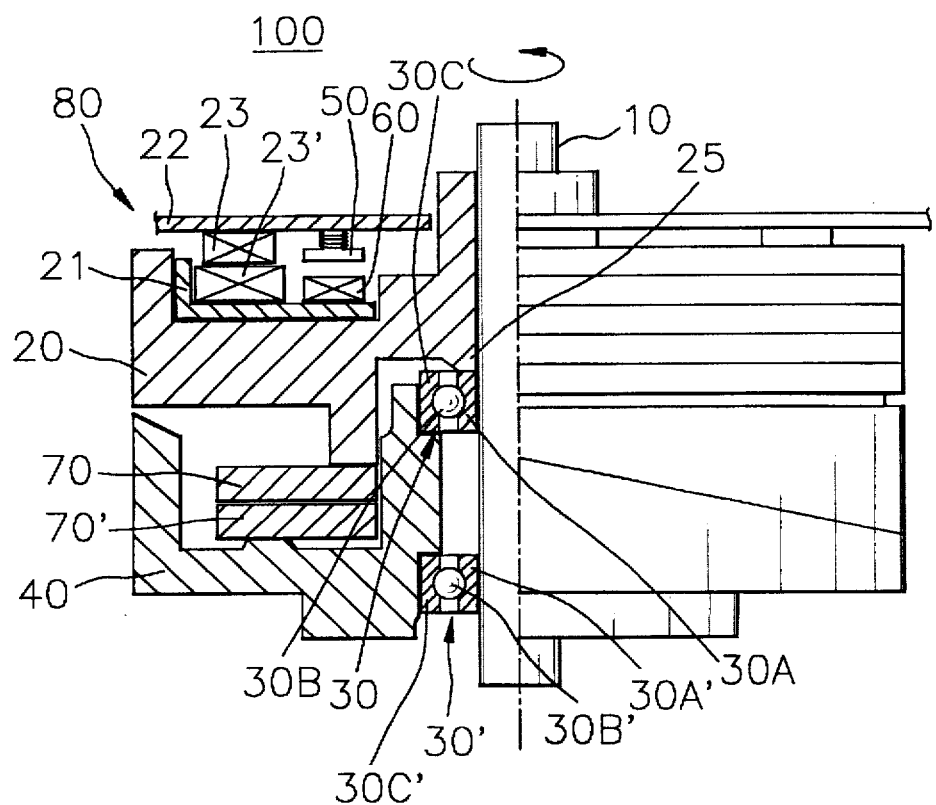
FIG. 2 illustrates a cross sectional view of a head drum assembly of the present invention.

Referring to FIG. 2, there is shown an inventive head drum assembly 100 for use in a VCR. The head drum assembly comprises a rotating shaft 10; a rotary drum 20; a rotary transformer 70; a stationary transformer 70'; a stationary drum 40; an upper bearing assembly 30 including an inner ring 30A as a set of ball bearings 30B, and an outer ring 30C; a lower bearing assembly 30' including an inner ring 30'A, a set of ball bearings 30'B, and an outer ring 30'C; a motor assembly 80; an electromagnet 50 with a predetermined pole orientation; and a permanent magnet 60 with the same pole orientation as the electromagnet 50.

The rotary drum 20 is furnished with an upper and a bottom surfaces. A motor rotor 21 of the motor assembly 80 and the rotary transformer 70 are installed on the upper surface and the lower surface of the rotary drum 20, respectively.

Meanwhile, the stationary drum 40 is furnished with an upper surface and is fitted around the rotating shaft 10. To insure that rotating shaft 10 rotates regularly and smoothly, the two bearing assemblies 30 and 30' are interposed between the stationary drum 40 and the rotating shaft 10, with the outer rings 30C, 30'C fitted into the former, and the inner rings 30A and 30'A closely fitted around the latter. Furthermore, the ball bearings 30B and 30'B are placed between the inner and outer rings of the bearing assemblies 30 and 30', respectively. Also, the stationary transformer 70' is attached on the upper surface of the stationary drum, facing and maintaining a small predetermined separation from the rotary transformer 70.

In addition, the motor assembly 80 includes a motor stator 22, installed directly above and parallel to the motor rotor 21; a permanent magnet 23 attached to a bottom surface of the motor stator 22; and a permanent magnet 23' situated on an upper surface of the motor rotor 21 and facing the permanent magnet 23. The electromagnet 50 is attached to the bottom surface of the motor stator 22 as well. Likewise, the permanent magnet 60 is placed opposite the electromagnet 50 on the upper surface of the motor rotor 21.

Figure 3:
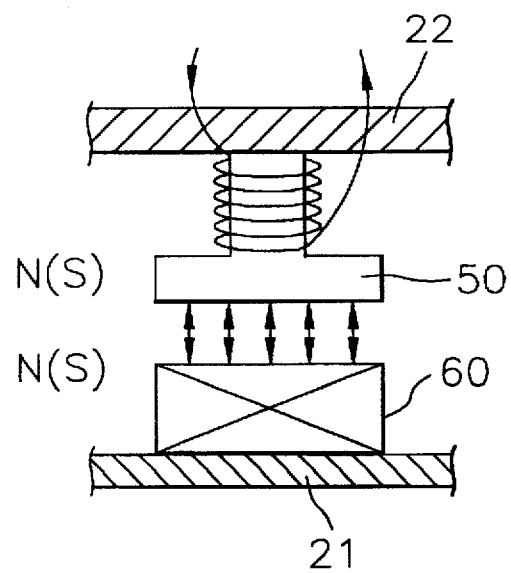
FIG. 3 provides a cross sectional view explaining the operation of essential elements of the inventive head drum assembly.

During an operation of the inventive head drum assembly, the motor assembly 80 rotates the rotating shaft 10 and the rotary drum 20 in relation to the stationary drum 40. At the same time, the electromagnet 50 is supplied with electric current from the motor assembly 80. The direction of the current running through the electromagnet 50 and the pole orientation of the permanent magnet 60 are chosen in such a way that there is generated a repulsive force therebetween, as illustrated in FIG. 3. This repulsive force pushes the rotary drum 20 down, and a small wedge-shaped protrusion 25 on bottom surface of the rotary drum 20 applies a uniform (i.e., pressing down with an equal force all around the ring) pressure against the inner ring 30A of the upper bearing assembly 30. On the other hand, the inner ring 30'A of the lower bearing assembly 30' is constrained from moving down the rotating shaft 10 by a stationary support (not shown).

The amount of repulsive force generated by the electromagnet 50 and the permanent magnet 60 can be controlled by applying different voltages to the electromagnet 50. Furthermore, the present invention applies pressure selectively: i.e., pressure is applied to the inner ring 30A of the bearing assembly 30 only when the rotating shaft 10 and the rotary drum 20 are rotating.

The head drum assembly 100 in accordance with the present invention achieves smooth rotation of the moving parts incorporated therein by applying a pressure uniformly along the length of an upper surface of the inner ring 30A of the upper bearing assembly 30. In addition, the present invention minimizes wear and tear of the bearing assemblies 30, 30' by selectively applying pressure only when necessary, i.e., at times when the rotary drum 20 and the rotating shaft 10 are rotating, thereby prolonging the lifespan of head drum assemblies used in VCR's.

While the present invention has been shown and described with reference to the particular embodiments, it will be apparent to those skilled in the art that many changes and modifications may be made without departing from the scope of the invention as defined in the appended claim.

What is claimed is:

1. A head drum assembly for use in a VCR comprising:

a rotating shaft;

a rotary drum provided with a recessed portion and fitted tightly around the rotating shaft, the recessed portion being formed on top of the rotary drum;

a stationary drum fitted around the rotating shaft;

a pair of bearing assemblies placed between the stationary drum and the rotating shaft;

a motor rotor installed on the recessed portion of the rotary drum;

a motor stator located on top of the motor rotor so as to maintain a predetermined separation therefrom;

pressure applying means for applying a uniform pressure to the bearing assemblies, wherein the pressure applying means comprises:

an electromagnet of a predetermined polarity placed on a bottom surface of the motor stator and activated by a voltage applied thereto when the rotary drum is rotating;

a permanent magnet having the same polarity as the electromagnet and being placed opposite the electromagnet on an upper surface of the motor rotor, thereby generating a repulsive force between the electromagnet and the permanent magnet; and a small wedged-shaped protrusion pressing down directly on the bearing assembly, said wedge-shaped protrusion being formed on a bottom surface of the rotary drum around the rotating shaft.

2. A head drum assembly for use in a VCR comprising:

a rotating shaft;

a stationary drum fitted around the rotating shaft;

a rotary drum fitted around the rotating shaft and longitudinally spaced from said stationary drum along the rotating shaft, said rotary drum having an upper surface facing in a direction opposite said stationary drum;

a protrusion formed on said rotary drum, said protrusion pressing down directly on a bearing assembly interposed between said stationary drum and said rotating shaft when the rotary drum rotates;

a motor rotor installed on the upper surface of the rotary drum;

a motor stator spaced apart from said motor rotor along the rotating shaft, said motor stator having a bottom surface opposing an upper surface of the motor rotor;

an electromagnet placed on the bottom surface of the motor stator; and a permanent magnet having the same polarity as the electromagnet and being placed on the upper surface of the motor rotor opposite the electromagnet;

wherein the electromagnet is arranged to repulse the permanent magnet only when the rotary drum rotates.

3. The assembly of claim 2, further comprising:

a recess formed on the upper surface of the rotary drum, said motor rotor being installed in said recess.

\* \* \* \* \*